Figure 1:
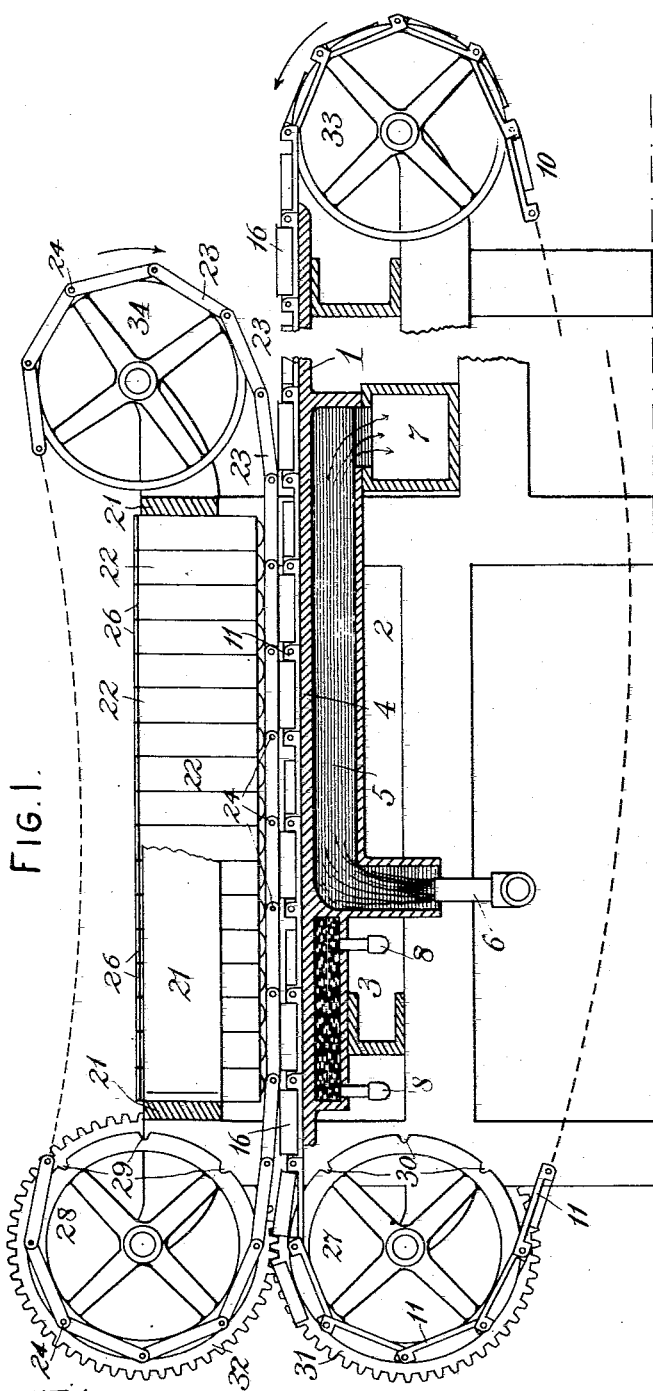

C. W. SLEEPER.
CAN SOLDERING MACHINE.
APPLICATION FILED NOV. 10, 1906.

939,104.

Patented Nov. 2, 1909.
2 SHEETS—SHEET 1.

Witnesses:
Wm. J. Whalley
R. N. Flint

Inventor:
Charles W. Sleeper
by his attorney

C. W. SLEEPER.
CAN SOLDERING MACHINE.
APPLICATION FILED NOV. 10, 1906.
939,104.
Patented Nov. 2, 1909.
2 SHEETS—SHEET 2.
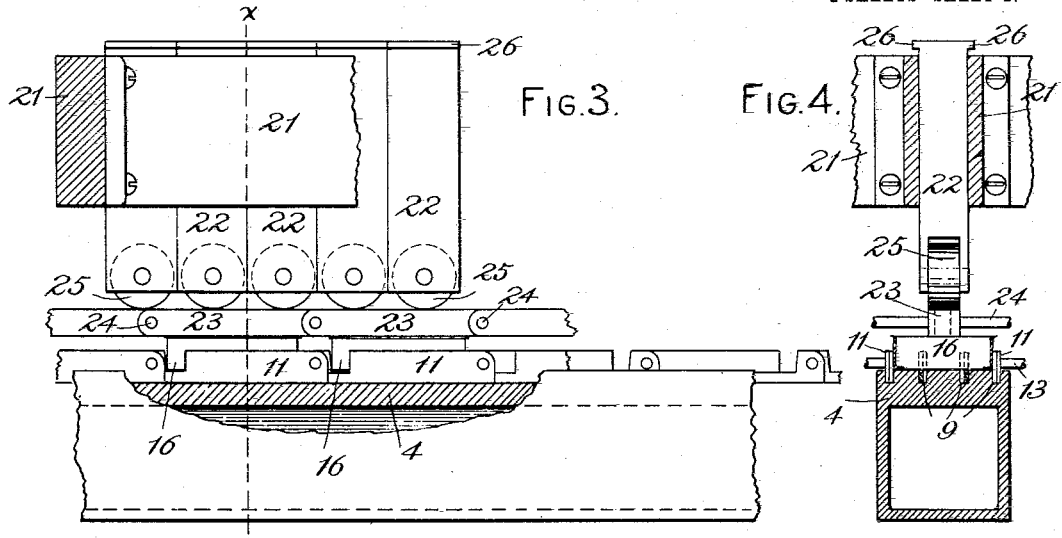
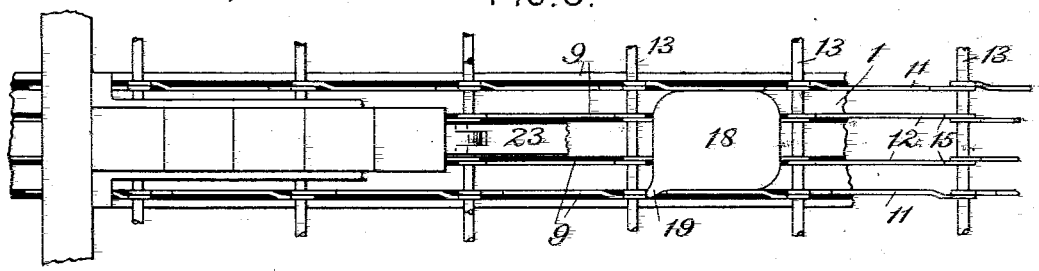
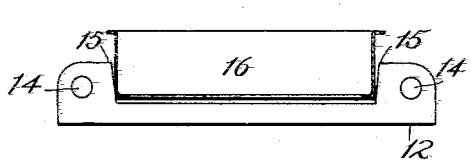
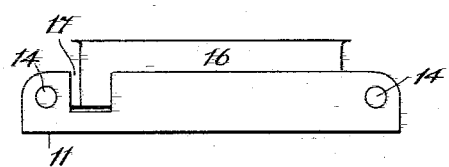
Witnesses:
Wm. J. Whalley
R. N. Flint
Inventor;
Charles W. Sleeper
by his attorney

UNITED STATES PATENT OFFICE.

CHARLES W. SLEEPER, OF LANCASTER, NEW HAMPSHIRE.

CAN-SOLDERING MACHINE.

939,104.

Specification of Letters Patent.   Patented Nov. 2, 1909.

Application filed November 10, 1906. Serial No. 342,858.

*To all whom it may concern:*

Be it known that I, CHARLES W. SLEEPER, a subject of the King of Great Britain and Ireland, residing at Lancaster, in the county of Coos, State of New Hampshire, have invented certain new and useful Improvements in Can-Soldering Machines, of which the following is a description, reference being had to the accompanying drawings, forming a part hereof.

My invention relates to can soldering machines of that class or type in which a can bottom is soldered to a flanged can body, the flanges of which have been previously coated with solder, by placing the can body and bottom in position and then causing them to move over a heated plate, whereby the solder is melted and the parts united; and the objects of my invention are to provide in such a machine an improved chain for moving the cans across the heated plate; to provide an improved heating arrangement for the heated plate; to provide improved means for holding the can body and bottom together with a yielding pressure while the can is moving across the heated plate and until the soldering operation is completed; and to provide such further features of construction and combinations of elements as are hereinafter described.

With these objects in view, my invention consists in the construction and combination of elements hereinafter described and particularly pointed out in the accompanying claims.

Figure 2:
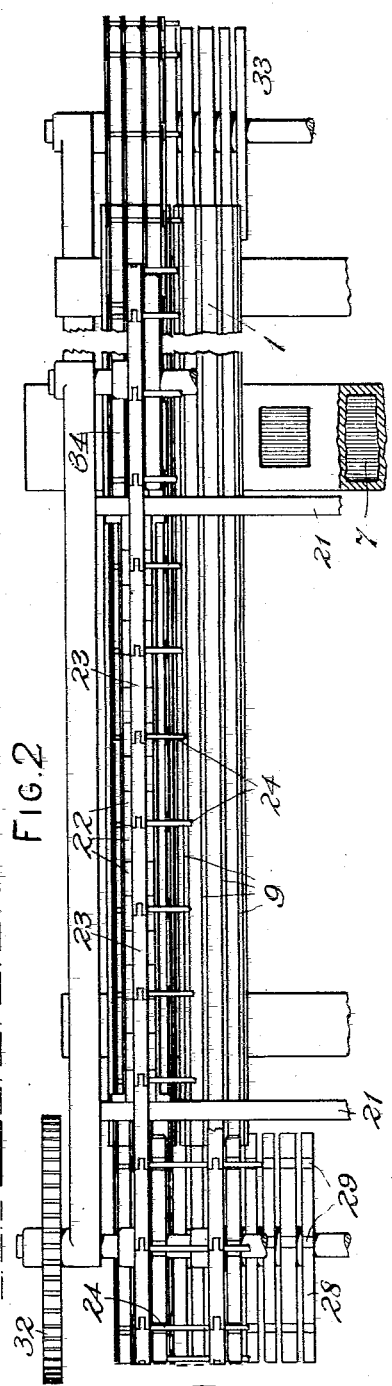

In the accompanying drawings, Figure 1 is a vertical longitudinal section of the machine, some of the parts however being shown in elevation; Fig. 2 is a plan view of one section of the machine; Fig. 3 is an enlarged detail view showing more clearly the arrangement of the weights for pressing the cans upon the heated plate; Fig. 4 is a cross section taken upon the line x—x of Fig. 3;
Fig. 5 is an enlarged view showing the chain for moving the cans across the heated plate, and showing also the weights for pressing the cans into contact with the heated plate; Figs. 6 and 7 are further enlarged views showing the manner in which the can is engaged by the links.

Referring to the drawings—1 represents the table of the machine, which table is made up of a heating section 2 and a cooling section 3. The upper surface 4 of the heating section 2 will be hereinafter referred to as a heated plate.

Within the heating section 2 is a flue 5 and at one end of said flue suitable heating means are provided for heating the plate 4, which means are shown by way of illustration as a gas burner 6. The other end of said flue communicates with a conduit 7 through which the products of combustion escape after heating the plate 4. It will be obvious that the gases traversing the flue will be at their highest temperature at the end thereof adjacent the burner 6, and that they will be coolest adjacent the flue 7; from which it follows that the temperature of the plate 4 will be considerably higher at its end adjacent the burner 6 than at its end adjacent the flue 7. It therefore follows that cans to be soldered when moved across said plate by means hereinafter disclosed, and in a direction from right to left as shown in Fig. 1, will first come into contact with the coolest portion of said plate; and the solder will be gradually heated and melted as the cans are moved to hotter portions of said plate.

The cooling section 3 of the table 1 is provided with suitable pipe connections for maintaining a flow of water therethrough as shown at 8, 8.

The upper surface of the table 1 is provided with a series of grooves shown at 9 extending longitudinally thereof, four similar grooves being shown in the drawing.

10 is a member referred to hereinafter as a chain, and comprising a series of sections, each section composed of a plurality of links 11 and 12, differing somewhat in structure, the several sections being flexibly connected by rods 13 passing through holes 14 in the links 11 and 12 into an endless member adapted to traverse the table 1 and move cans to be soldered across the heated plate and through the machine. The links 11 and 12 of the chain 10 project into the grooves 9 as the chain passes over the table 1, and the portion of the inner links 12 which would project above the surface of the table or heated plate is cut away as shown in Fig. 6, thereby forming shoulders as shown at 15; while the greater part of the upwardly projecting portion of the outside links 11 is retained as shown in Fig. 7.

Figs. 6 and 7 show at 16 a can in the position it occupies with reference to the links of the chain and it will be seen that by reason of the links 12 being cut away the can is permitted to rest directly upon the surface of the heated plate as it is forced forward by the shoulders 15 of said links, while the portions of the links 11 which are not cut away will keep the can from moving sidewise or slipping from the machine.

A small portion of the links 11 is shown cut away at 17 in the particular machine illustrated to enable the machine to operate upon cans, the cover 18 of which has a projection 19 so that the can may be opened by a key, but such opening is unnecessary when the machine is to operate upon other types of cans.

The elements designated as 21 collectively constitute a guiding member supported in a fixed position above the table 1 of the machine, the purpose of which is to engage a series of weights 22 and maintain them in an upright position. The said weights are each capable of a limited vertical movement independently of the others of the series, and they are provided for the purpose of subjecting the cans as they are moved through the machine, to pressure to thereby force the body and top of the can together as the solder melts, and to maintain such pressure upon the cans while they are passing over the cooling section 3 of the table and until they finally leave the machine.

As a pressure applying member such as above described might, if allowed to act directly upon the cans, tend to displace them, I provide a flexible member interposed between the pressure applying member and the cans, whereby the tendency to displace the cans is lessened. I have shown such flexible member as comprising a moving chain made up of a series of links 23 connected by rods 24, which chain is driven in the same direction and at the same velocity as the chain 10. The links 23 rest directly upon the upper ends of the cans as they are moved through the machine, and the weights 22 exert pressure upon the upper surface of said links; whereby the can body and bottom or cover to be soldered thereto are pressed firmly together and maintained in firm contact during their transit through the machine.

For the purpose of minimizing the friction between the stationary weights 22 and the moving links 23, the lower end of each weight is provided with a roller 25; and in order that the weights 22 may not fall too far when no cans are in the machine, said weights are provided with projections 26 for engaging the guiding member 21 and thus limiting the downward movement of the weights.

27 and 28 are wheels provided with depressions 29 and 30 for engaging the rods 13 and 24 of the two chains for driving them, and these wheels are geared together by gears 31 and 32 so as to cause the chains to move in unison. 33 and 34 are idle wheels for supporting the other ends of the chains.

It will be seen that the guiding member 21, weights 22, moving chain 23, and other elements coöperating therewith and constituting the means whereby the cans are pressed against the heated plate in my can soldering machine, are located in a definite relation with respect to the heated plate, which relation is invariable during the operation of the machine. In defining this relation, I refer to the pressure applying means as being stationary, because said means as a whole partakes of no appreciable movement toward or from the heated plate, and of no movement whatever in a direction transverse to the heated plate. I use this term in order to distinguish my machine from can soldering machines in which a pressure applying member functionally somewhat similar to that herein disclosed moves along with the cans as they move along a heated plate, and from other can soldering machines in which a pressure applying member normally out of contact with and located above the cans is moved downward to contact with the cans and press them against a heated plate when the cans are to be soldered. As, however, it would be impracticable to so adjust the parts of such a stationary pressure applying member that the cans would just fill the space between the heated plate and said member, I have designed said members so that a part thereof may yield as the cans are forced between it and the heated plate, and to that extent a part of the pressure applying means is capable of a slight movement away from the heated plate, and this feature I refer to by defining the pressure applying means as yielding, although it will be understood that said means as a whole partakes of no appreciable movement with respect to the heated plate at such times. Thus while in my can soldering machine the pressure applying means may yield and to that extent partake of a slight movement away from the heated plate, it will be apparent that the operation of the machine involves no pronounced movement of the pressure applying means as is the case with the pressure applying devices employed in the other types of can soldering machines above referred to.

It will be obvious that a plurality of machines such as have been above described may be placed side by side as indicated in Figs. 2 and 5; and in fact the description hereinbefore occurring is intended to describe one section of such a machine rather than a complete machine as it is actually built and sold.

Having thus described my machine and explained the mode of operation thereof, I claim and desire to secure by Letters Patent:

1. In a can soldering machine, a heated plate; a weight located above said plate; and means for moving cans to be soldered across said plate beneath said weight, the relative arrangement of the parts being such that the weight will exert pressure upon the cans being soldered throughout their movement across said plate to force them into contact therewith.

2. In a can soldering machine, a heated plate; a series of weights located above said plate; and means for moving cans to be soldered across said plate beneath said weights, the relative arrangement of the parts being such that the weights will maintain a yielding pressure upon the cans throughout their movement across the plate.

3. In a can soldering machine, a heated plate; a series of weights located above said plate and free to move vertically; a guiding member for maintaining said weights in position; means for moving cans to be soldered across said plate beneath said weights; and means whereby said weights exert pressure upon said cans throughout their movement across said plate.

4. In a can soldering machine, a heated plate; a series of weights located above said plate and capable of limited vertical movement; a guiding member for maintaining said weights in position; a flexible member beneath said weights and upon which they rest said member being adapted to contact with the cans throughout their movement across said heated plate; and means for moving cans to be soldered across said plate beneath and in contact with said flexible member.

5. In a can soldering machine, a heated plate; a series of weights located above said plate and capable of limited vertical movement; a roller upon the lower end of each of said weights; a guiding member for maintaining said weights in position; a movable flexible member beneath said weights and upon which they rest, said member being adapted to contact with the cans throughout their movement across said heated plate; means for moving cans to be soldered across said plate beneath and in contact with said flexible member; and means for moving said flexible member.

6. In a can soldering machine, means for heating the cans to be soldered; means comprising an endless chain for moving the cans to be soldered over the heating means; a second endless chain located above the first mentioned chain and adapted to rest upon the cans being soldered throughout their movement over the heating means; and means for applying pressure to the upper surface of said second chain.

7. In a can soldering machine, means for heating the cans to be soldered, means for cooling the soldered cans, means comprising an endless chain for moving the cans to be soldered over the heating and cooling means; a second endless chain located above the first mentioned chain and adapted to rest upon the cans being soldered throughout their movement over the heating and cooling means; and means for applying pressure to the upper surface of said second chain.

8. In a can soldering machine, a plate comprising heating and cooling sections; means comprising an endless chain for moving cans to be soldered across said plate; a second endless chain located above said first mentioned chain and adapted to rest upon the cans being soldered throughout their movement across said plate; means for applying pressure to the upper surface of said second chain; and means for driving said chains in unison.

9. In a can soldering machine, a plate comprising heating and cooling sections; means comprising an endless chain for moving cans to be soldered across said plate; a second endless chain located above said first mentioned chain and adapted to rest upon the cans being soldered throughout their movement across said plate; a series of weights resting upon said second chain; and means for driving said chains in unison.

10. In a can soldering machine, a plate comprising heating and cooling sections; means comprising an endless chain for moving cans to be soldered across said plate; a second endless chain located above said first mentioned chain and adapted to rest upon the cans being soldered throughout their movement across said plate; a series of weights adapted to exert pressure upon the upper surface of said second chain; and means for driving said chains in unison.

11. In a can soldering machine, a plate comprising heating and cooling sections; means comprising an endless chain for moving cans to be soldered across said plate; a second endless chain located above said first mentioned chain and adapted to rest upon the cans being soldered throughout their movement across said plate; a guiding member located above said plate; a series of weights resting upon the upper surface of said second chain and maintained in position by said guiding member; and means for driving said chains in unison.

12. In a can soldering machine, a heated plate; grooves formed in the upper surface of said plate and extending longitudinally thereof; and an endless chain adapted to move cans to be soldered across said plate, the links of said chain traversing said grooves, and each link comprising side members extending above the surface of the plate and adapted to restrain the cans against lateral movement and an intermediate member, the portion of said intermediate member extending above the surface of the plate being cut away so that the cans may rest directly upon the heated plate.

13. In a can soldering machine, a heated plate; means for moving cans to be soldered across said plate; a flexible member adapted to rest upon the cans throughout their movement across said plate; and means for applying pressure to said flexible member.

14. In a can soldering machine, means for heating the cans to be soldered; means for moving the cans to be soldered over said heating means; a flexible member adapted to rest upon the cans being soldered throughout their movement over the heating means; and means for applying pressure to the flexible member.

15. In a can soldering machine, a heated plate; means comprising an endless chain for moving cans to be soldered across said plate; a second endless chain located above said first mentioned chain and adapted to rest upon the cans being soldered throughout their movement across said plate; means for applying pressure to the upper surface of said second chain; and means for driving said chains in unison.

This specification signed and witnessed this seventh day of November A. D. 1906.

CHARLES W. SLEEPER.

In the presence of—
FRED C. CLEAVELAND,
BERNICE A. LYMAN.